(12) United States Patent
Chandler

(10) Patent No.: US 9,606,758 B1
(45) Date of Patent: Mar. 28, 2017

(54) SYSTEM AND METHOD OF CONNECTING A COMPUTER TO A PRINTER

(71) Applicant: NCR Corporation, Duluth, GA (US)

(72) Inventor: Kevin Mitchell Chandler, Centerville, OH (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/865,791

(22) Filed: Sep. 25, 2015

(51) Int. Cl.
*G06F 3/12* (2006.01)
*G06Q 20/20* (2012.01)
*G06K 15/00* (2006.01)

(52) U.S. Cl.
CPC .......... *G06F 3/1236* (2013.01); *G06F 3/1206* (2013.01); *G06F 3/1226* (2013.01); *G06F 3/1287* (2013.01); *G06F 3/1289* (2013.01); *G06Q 20/209* (2013.01)

(58) Field of Classification Search
CPC ........ G06F 13/00; G06F 13/10; G06F 3/1204; G06F 3/1206; G06F 3/1226; G06F 3/1236; G06F 3/1287; G06F 3/1289; G06F 9/44505; G06F 12/10; G06F 17/30861

USPC ...... 358/1.1, 1.13, 1.14, 1.15, 402; 710/2, 5, 710/8, 11, 15
See application file for complete search history.

(56) References Cited

U.S. PATENT DOCUMENTS

| 8,886,842 | B2* | 11/2014 | Chandler | G06F 3/00 710/11 |
| 9,069,497 | B2* | 6/2015 | Natori | G06F 3/1205 |
| 2010/0024003 | A1* | 1/2010 | Malledant | H04L 63/10 726/3 |
| 2010/0161725 | A1* | 6/2010 | Gershom | G06F 3/1203 709/203 |

* cited by examiner

*Primary Examiner* — Gabriel Garcia
(74) *Attorney, Agent, or Firm* — Paul W. Martin

(57) ABSTRACT

A system and method of connecting a computer to a printer which reduces the number of hardware printing devices. An example method includes determining that a virtual printer is available for use, broadcasting over a network that the peripheral is available for use, receiving a request from the first computer through a web service to connect to the virtual printer, mapping the virtual printer to the first computer, and sending information to the first computer through the web service to facilitate connection by the first computer to the virtual printer through the second computer.

8 Claims, 5 Drawing Sheets

FIG. 4

```
<?xml version="1.0" encoding="utf-8" ?>
<DeviceManager ver="2.0"
        xmlns:xsi="http://www.w3.org/2001/XMLSchema-instance"

xsi:noNamespaceSchemaLocation="..\Applications\Schemas\DeviceManager2.xsd">
 <Devices>
  <Device name="PrintSpooler" ofmCreationClassName="AsOposPrinter"
terminator="">
    <OposOptions oposDeviceName="NCRPOSPrinter.0" />
    <PrintSpoolerOptions ofmCreationClassName="AsPrinterSpoolerStub"/>
   <Custom>
   <Printer>
    <OposPrinterOptions receiptWidth="44" />
    <PrinterLogo fileName="c:\NCRLogo.bmp" position="Center" printWidth="1500"  />
   </Printer>
   </Custom>
  </Device>
  <Device name="Printer" ofmCreationClassName="AsPrinterSpoolerProxy"
terminator="SlipIn">
   <PrintSpoolerClientOptions remotePrintSpooler="PrintSpooler" />
   <StubOptions ofmCreationClassName="AsPrinterStub" />
   </Device>
  </Devices>
</DeviceManager>
```

54 → (first Device block)
56A → (second Device block)
59A (label)

FIG. 5

```
<?xml version="1.0" encoding="utf-8" ?>
<DeviceManager ver="2.0"
        xmlns:xsi="http://www.w3.org/2001/XMLSchema-instance"

xsi:noNamespaceSchemaLocation="..\Applications\Schemas\DeviceManager2.xsd">
 <Devices>
  <Device name="Printer" ofmCreationClassName="AsPrinterSpoolerProxy"
terminator="SlipIn">
    <PrintSpoolerClientOptions ofmCreationClassName="AsPrinterSpooler"
remoteStationName="Station1" remotePrintSpooler="PrintSpooler" />
   <StubOptions ofmCreationClassName="AsPrinterStub" />
   </Device>
  </Devices>
</DeviceManager>
```

56B, 59B (labels)

SYSTEM AND METHOD OF CONNECTING A COMPUTER TO A PRINTER

BACKGROUND

Computer systems typically include one or more processors, memory, program and data storage, a display, and other circuitry for connecting to peripherals, such as a keyboard or other input device.

In some environments, such as retail point-of-sale (POS) environments, equipping each POS terminal with a set of peripherals is expensive and causes each POS terminal to have a large footprint in a store.

One solution for minimizing the number of peripherals is disclosed in commonly-assigned U.S. Pat. No. 8,886,842, issued Nov. 11, 2014. This patent is hereby incorporated by reference.

It would be desirable to further improve upon this solution and further minimize the number of peripherals by minimizing the number of hardware printing devices.

SUMMARY

A system and method of connecting a computer to a printer is provided.

An example system includes a processor connected to a network and to first computers and to second computers through the network. The first computers execute application software and the second computers each include one or more peripherals organized with the second computers as peripheral stations. Some peripheral stations may include a virtual printer. Other peripheral stations may include a virtual printer, a print spooler, and physical printer or hardware printing device. The virtual printers direct jobs to the print spooler for ultimate printing by the physical printer.

An example method of connecting a first computer to a virtual printer of a second computer includes determining that a virtual printer is available for use, broadcasting over a network that the peripheral is available for use, receiving a request from the first computer through a web service to connect to the virtual printer, mapping the virtual printer to the first computer, and sending information to the first computer through the web service to facilitate connection by the first computer to the virtual printer through the second computer.

An example peripheral station includes a computer configured with a virtual printer to receive requests from a software application of another computer to print using the virtual printer and to send print jobs from the virtual printer to a print spooler and a hardware printing device.

BRIEF DESCRIPTION OF THE DRAWINGS

FIG. 4 is a portion of an example configuration file of a peripheral station.

FIG. 5 is a portion of an example configuration file of another peripheral station.

DETAILED DESCRIPTION

Figure 1:
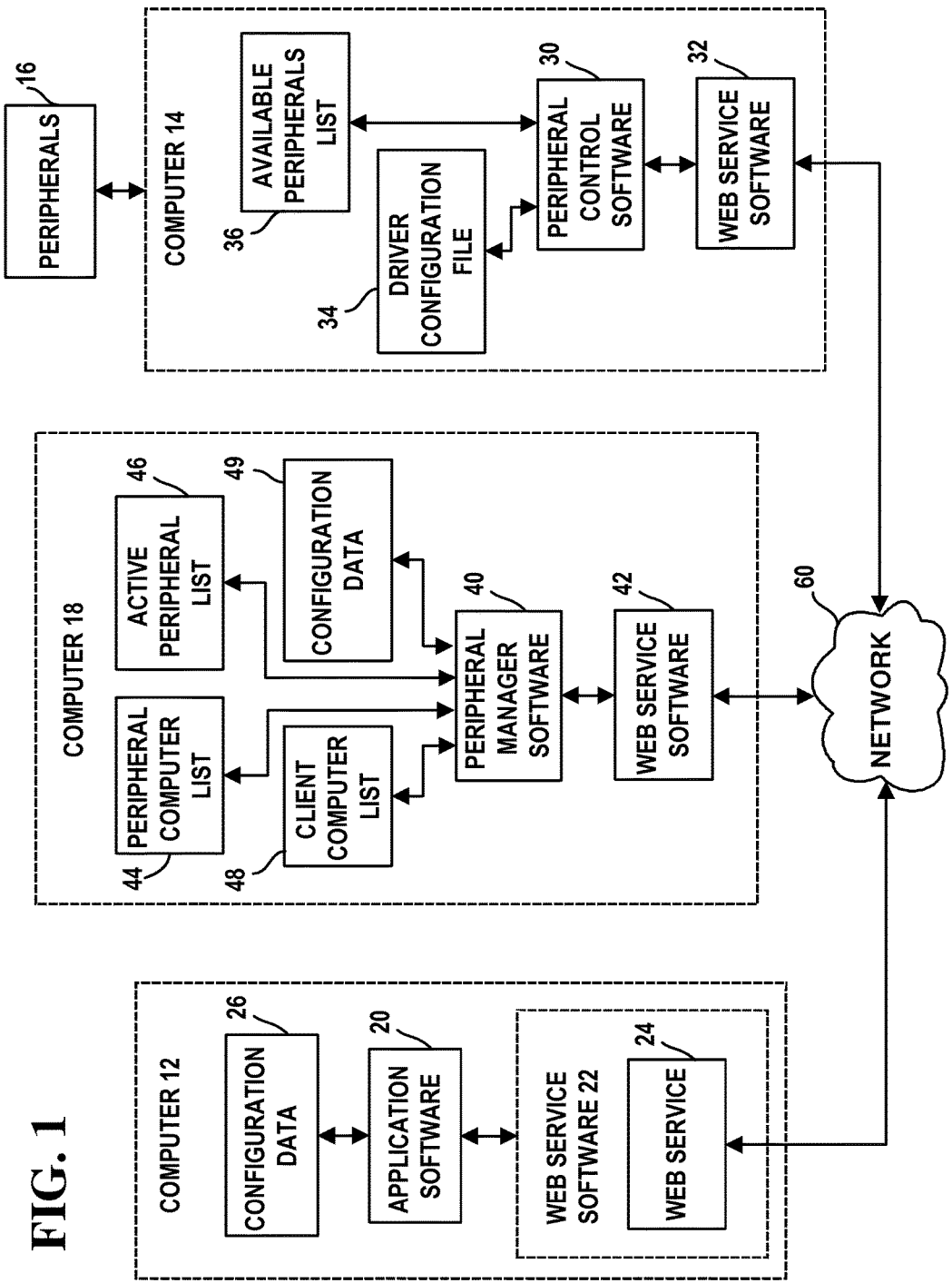
FIG. 1 is a block diagram of an example system.

Referring now to FIG. 1, an example system includes computer 18 connected by network 60 to computer 14 and one or more peripherals 16, and to computer 12.

Computer 12 includes one or more processors, memory, and program and data storage. Computer 12 may execute an operating system, such as a Microsoft, Google, Apple, or Linux operating system. Computer 12 further includes network circuitry for connecting to network 60, via wire and/or wireless, and other circuitry for connecting to one or more peripherals, such as an input device and display (e.g., a touch overlay to the display). For example, computer 12 may include Universal Serial Bus (USB) circuitry and/or Bluetooth standard circuitry.

Computer 12 may include, but not be limited to, a personal computer, a portable computer, or a mobile computing/communication device, such as a smart phone, tablet, or personal digital assistant. Since computer 12 shares peripherals 16 coupled to computer 14, computer 12 may be used in environments requiring a computing solution with a smaller footprint than a computer with peripherals 16. Sharing of peripherals 16 may also provide cost advantages. For example, one or more computers 12 may be used in a retail point-of-sale (POS) environment.

Computer 12 executes other computer software that may be stored in a computer readable medium. For example, computer 12 executes application software 20 and World Wide Web (web) service software 22.

Application software 20 performs one or more functions which may require use of peripherals 16. For example, application software 20 may include POS transaction software that requires use of a printer to print a receipt, a barcode reader to scan a product barcode, or a payment peripheral, such as a payment terminal with a keypad and a card reader. Application software 20 can be written in any software language.

Application software 20 connects to peripherals 16 through web service software 22. Application 20 may use configuration data 26 to identify peripherals that are locally connected to computer 12, for example, directly connected to a USB port of computer 12, from peripherals 16, which are remotely accessible through a network connection to computer 14. Configuration data 26 may also include settings governing when the local and remote peripherals should be used.

If configuration data 26 includes a remote peripheral 16, application software 20 sends a request to peripheral station manager 40 at computer 18. Peripheral manager software 40 sends a message to application software 20 through web service software 24 and 42 with information identifying computer 14 and peripheral 16.

Web service software 22 facilitates communication of data between application software 20 and other applications on other computers, including computer 14. For example, web service software 22 may include one or more standard web services 24. In addition, web service software 22 may include web service support software, such as application server software for hosting the web service 24, and Hypertext Transfer Protocol (HTTP) or web server software for providing HTTP protocol message support.

Web service 24 may include an Extensible Markup Language (XML) document in a Web Services Description Language (WSDL) describing operations, messages, bindings, and a location or address at which web service 24 may be called. Web service 24 may communicate using open protocols, such as Simple Object Access Protocol (SOAP) over HTTP.

Web service 24 is tailored to meet the interoperability requirements of application software 20. For example, when application software 20 calls web service application 24 and requests use one or more of peripherals 16, web service 24 communicates with computer 14 using XML messages to establish a connection between application software 20 and peripherals 16. The web service of computer 14 supports WSDL, which has known methods for controlling peripherals 16.

Computer 14 includes one or more processors, memory, and program and data storage. Computer 14 may execute an operating system, such as a Microsoft, Google, Linux, or Apple operating system. Computer 14 may execute other computer software that may be stored in a computer readable medium, such as a memory. Computer 14 may include network circuitry for connecting to network 60, via wire and/or wireless, and circuitry for connecting to peripherals 16, such as network, USB and/or Bluetooth standard circuitry.

Computer 14 may be logically grouped with peripherals 16 into a peripheral station 50. One or more peripheral stations 50 are envisioned, depending upon environment. For example, in a retail POS environment, any of a plurality of POS computers 12 may connect to any of a plurality of peripheral stations 50. Further, any of a plurality of mobile computers 12 may connect to any of plurality of peripheral stations 50 via wireless networking.

Computer 14 may have one or more other purposes besides establishing peripheral connections. As such, computer 14 may further include software and components necessary for its purpose.

For example, computer 14 may include graphics circuitry for connecting to a display and may couple to other peripherals, such an input device (e.g., a touch overlay to the display), and operate as a POS terminal.

Figure 2:
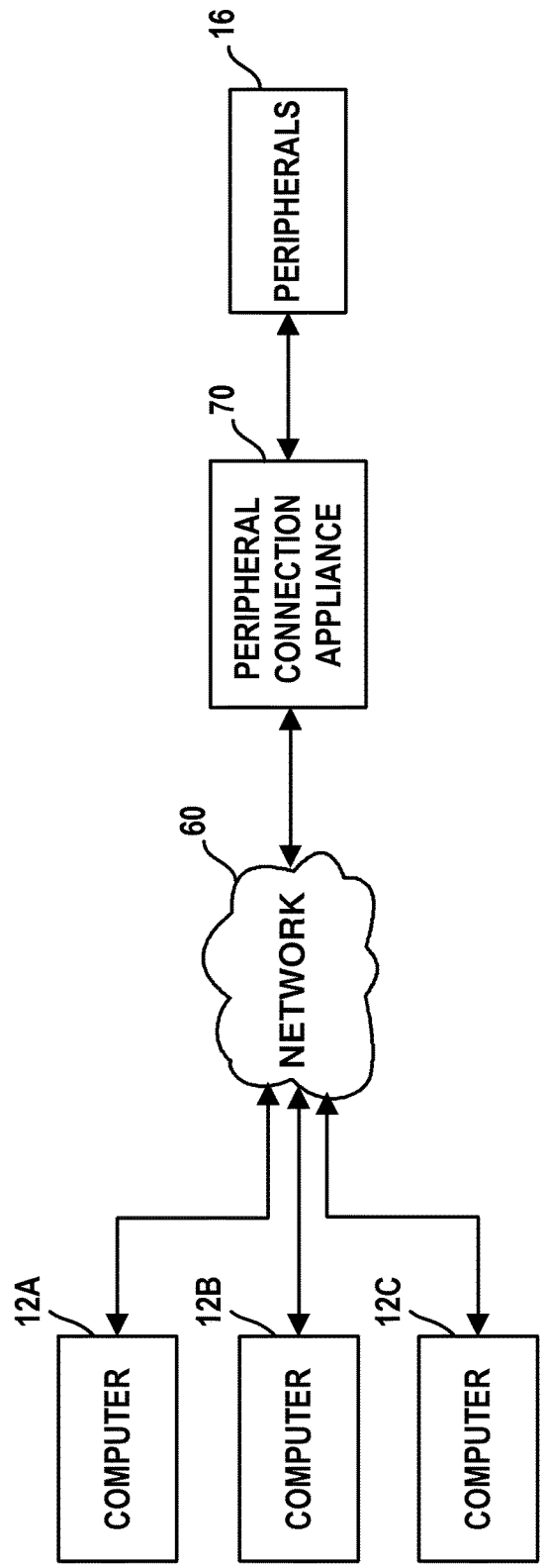
FIG. 2 is a diagrammatic view of the example system.

Alternatively, the functions of computer 14 may be combined with computer 18 into a single computer system or peripheral connection appliance 70 connected to network 60 that is primarily dedicated to coupling other computers 12, such as computer 12A through 12C, to peripherals 16 (FIG. 2).

Computer 14 executes other computer software that may be stored in a computer readable medium. For example, computer 14 executes peripheral control software 30.

Peripheral control software 30 configures peripherals 16 and stores configuration settings in driver configuration data 34. Driver software or 'drivers' for peripherals 16 may be bundled with the operating system. For this purpose, peripheral control software 30 may use a driver configuration utility within the operating system to configure peripherals 16.

Alternatively, some drivers may be provided separately and installed in accordance with instructions from manufacturers of peripherals 16. For example, in a retail store environment, the drivers for peripherals 16 may include Object Linking and Embedding for Retail POS (OPOS) drivers. For this purpose, peripheral control software 30 may use an OPOS driver configuration utility to configure peripherals 16 based upon settings in configuration data 34.

Configuration data 34 contains a list of peripherals 16 listed as locally connected to computer 14 and may include settings governing when peripherals 16 should be used. If configuration data 26 indicates that a peripheral is an OPOS peripheral, configuration data 34 may indicate any OPOS software, such as OPOS service objects, that are needed to assist in controlling the OPOS peripheral.

Peripheral control software 30 maintains a list 36 of peripherals 16 that are configured. Peripheral control software 30 includes only peripherals 16 that are online and working, i.e., not peripherals that are powered off or malfunctioning. Peripheral control software 30 additionally makes list 36 available to other applications and computers by periodically broadcasting messages identifying availability of peripherals 16. For example, peripheral control software 30 may send messages with a peripheral station name. Peripheral control software 30 may further include web server software for hosting a web page containing list 36.

In an example embodiment, peripheral control software 30 may be written in C-Sharp, Visual Basic Script, Javascript, or other suitable language, and may be combined with hypertext markup language (HTML) or other suitable web development language in a web page.

Associated with peripheral control software 30 is web service software 32, which, like web service software 22, includes a standard web service and associated web service support software. Web service software 32 facilitates communication of data between peripheral control software 30 and other applications.

Computer 18 includes one or more processors, memory, and program and data storage. Computer 18 may execute an operating system, such as a Microsoft, Google, Linux, or Apple operating system. Computer 18 may execute other computer software that may be stored in a computer readable medium, such as a memory. Computer 18 may include network circuitry for connecting to network 60, via wire and/or wireless, and circuitry for connecting to peripherals 16, such as network, USB and/or Bluetooth standard circuitry.

Computer 18 may primarily manage peripheral stations 50 and coupling of other computers, such as computer 12, to peripheral stations 50. As such, computer 18 may include a server computer with a network interface with connections to network 60.

Computer 18 may have one or more other purposes besides establishing peripheral connections. As such, computer 18 may further include software and components necessary for its purpose.

For example, computer 18 may include graphics circuitry for connecting to a display and may couple to other peripherals, such an input device (e.g., a touch overlay to the display).

Alternatively, the functions of computer 18 may be combined with computer 14 into a single computer system or peripheral connection appliance 70 connected to network 60 that is primarily dedicated to coupling other computers 12, such as computer 12A through 12C, to peripherals 16 (FIG. 2).

Computer 18 executes other computer software that may be stored in a computer readable medium. For example, computer 18 executes peripheral manager software 40 and web service software 42.

Web service software 42, like web service software 22, includes a standard web service and associated web service support software. Web service software 42 facilitates communication of data between peripheral manager software 40 and other applications. Web service software 42 acts as a discovery service for helping computers like computer 12 find and connect to peripherals 16.

Peripheral manager software 40 receives the broadcast messages from peripheral control software 30, obtains the name of the peripheral station 50 from the message and determines the internet protocol (IP) address of computer 14 from the message. Peripheral manager software 40 lists the peripheral stations 50 in configuration data 49.

Peripheral manager software 40 further obtains list 36 of configured peripherals 16 from peripheral control software 30, maintains list 36 as list 46 of active peripherals 16, regularly receives updated lists 36, and updates list 46 as peripherals 16 become available or unavailable. Peripheral manager software 40 may manage connections to peripherals 16 of a plurality of computers 14.

Peripheral manager software 40 maintains a list 44 of computers 14 that have peripherals 16 to share, establishes logical groups, and assigns peripherals 16 to the logical groups or device clusters. For example, peripheral manager software 40 may group all peripherals 16 associated with a first computer 14 into a first peripheral station 50 or "PeripheralStation1".

Peripheral manager software 40 further maintains a list 48 of computers 12 requesting connections to peripherals 16 and manages connection and release of peripherals 16 in list 48, or groups of peripherals 16, from computers in list 44. Peripheral manager software 40 may combine, in any combination, lists 44, 46, and 48 into a mapping of computers 12 to peripherals 16 as configuration data 49.

In an example embodiment, peripheral control software 40 may be written in C-Sharp, Visual Basic Script, Javascript, or other suitable language, and may be combined with hypertext markup language (HTML) or other suitable web development language in a web page.

Network 60 may include one which uses the transmission control protocol/internet protocol (TCP/IP). Network 60 may include a combination of local area and wide area networks. Network 60 may include any combination of wireless or wired networks. Network 60 may include a combination of private and public networks, including a global communication network, also known as the Internet.

Figure 3:
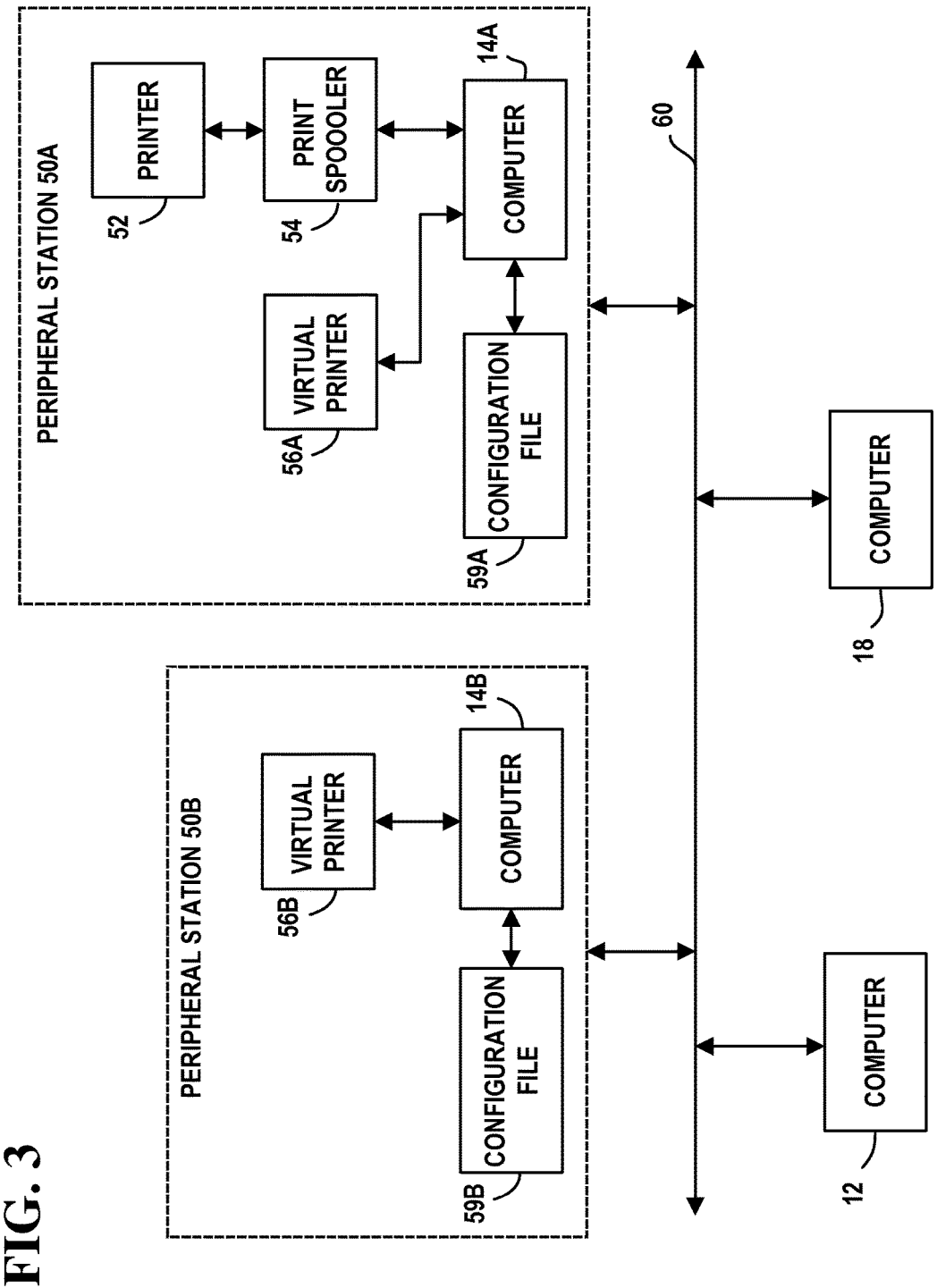
FIG. 3 is a block diagram of another example system.

With reference to FIG. 3, an example system configuration includes one or more computers 12, computer 18, and a plurality of peripheral stations 50A and 50B. Computers 12 may include POS computers and peripheral stations 50A and 50B may be located in or around the POS computers where customers complete purchase transactions.

Example peripheral station 50A may include computer 14A and one or more peripherals 16 including printer 52, print spooler 54, and virtual printer 56A. Printer 52 is a physical printer or hardware printing device for printing receipts and other items. Print spooler 54 spools received jobs for printing by printer 52. Virtual printer 56A is a software interface for printing the receipts and other items. Peripheral station 50A may include additional peripherals 16 suited to its purpose.

Configuration information for example peripheral station 50A is stored in configuration file 59A (FIG. 4). In an example configuration, printer spooler 54 is defined with the name "PrintSpooler" and is configured as a standard OPOS printer.

Virtual printer 56A is defined with the name "Printer". Output from virtual printer 56A is configured to be redirected to print spooler 54.

Under this configuration, virtual printer 56A is configured to be used directly by a client computer, such as computer 12, because it is configured with a "StubOptions" tag. On the other hand, print spooler 54 cannot be used directly by a client computer, such as computer 12, because it is not configured with a "StubOptions" tag. Print spooler 54 is only configured to be used by virtual printers 54.

Example peripheral station 50B may include computer 14B and one or more peripherals 16 including a logical or virtual printer 56B. Virtual printer 56B is a software interface for printing receipts and other items. Actual printing of receipts and other items occurs at a hardware printing device, such as printer 52 of peripheral station 50A. Peripheral station 50B may include additional peripherals 16 suited to its purpose.

Configuration information for example peripheral station 50B is stored in configuration file 59B (FIG. 5). In an example configuration, virtual printer 56B is defined with the name "Printer" and output from virtual printer 56B is configured to be redirected to print spooler 54 of peripheral station 50A, identified as "Station1" in configuration file 59B.

Under this configuration, virtual printer 56B is configured to be used directly by a client computer, such as computer 12, because it is configured with a "StubOptions" tag.

Advantageously, the example configuration reduces the number of peripherals 16 in a store configuration by reducing the number of physical printers 52. Further, printer 52 effectively becomes part of peripheral station 50B, or any other peripheral station 50 that does not have a hardware printing device.

Figure 6:
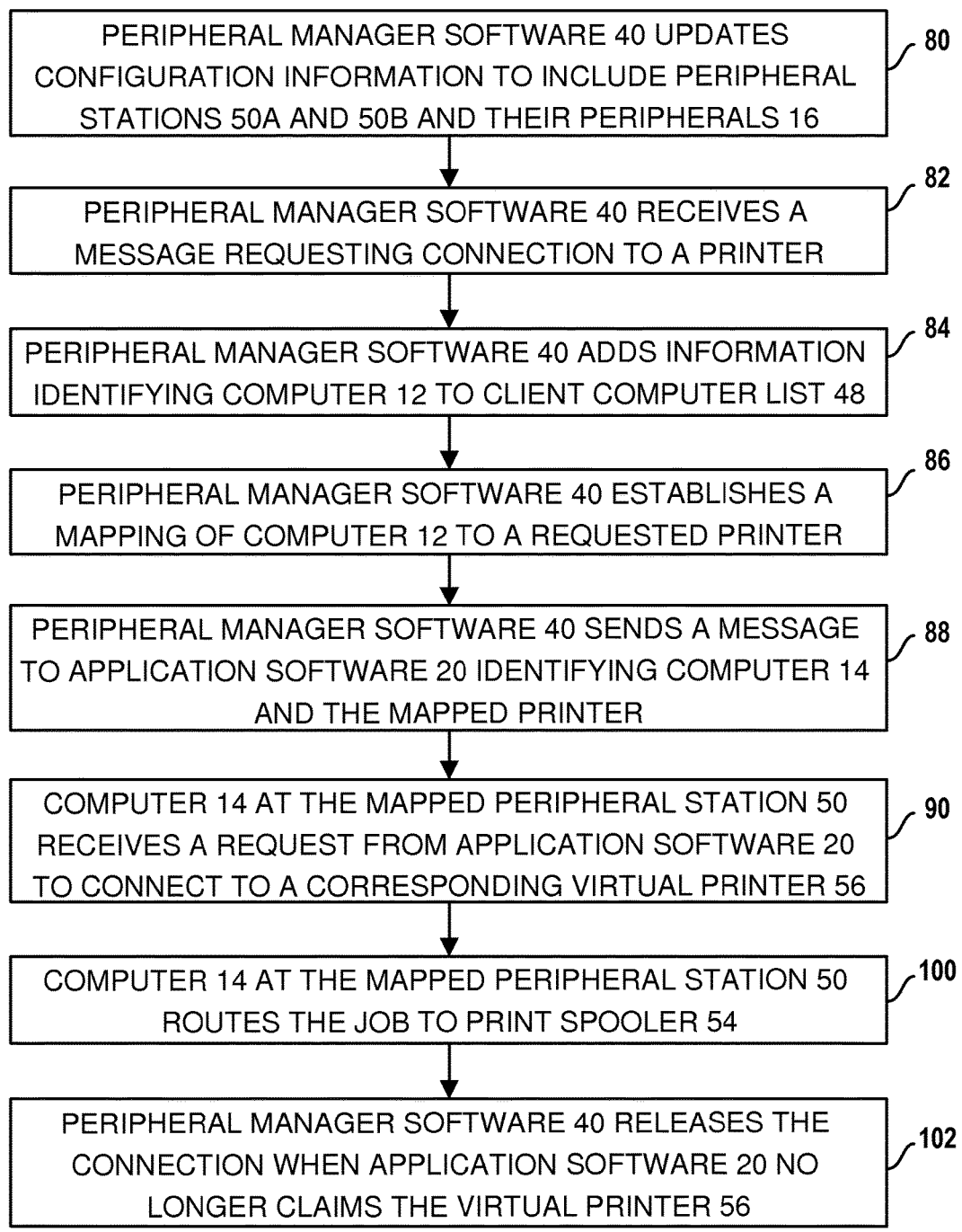
FIG. 6 is a flow diagram illustrating a method of connecting a computer to a peripheral.

Referring now to FIG. 6, a method of connecting a computer to a printer is illustrated beginning with step 80.

In step 80, peripheral manager software 40 updates configuration information, for example, peripheral computer list 44 and active peripheral list 46, to reflect that peripheral stations 50A and 50B and their peripherals 16 are active and available for use by applications 20. Peripheral manager software 40 uses this information to display the status of peripherals 16 and to show the overall status of peripheral stations 50A and 50B.

In an example embodiment, peripheral manager software 40 receives a message from peripheral control software 30 of peripheral station 50A through corresponding web service software 32 and 42 indicating that printer 52, print spooler 54, virtual printer 56A, and any other associated peripherals 16 are active and available for use.

Peripheral manager software 40 also receives a message from peripheral control software 30 of peripheral station 50B through corresponding web service software 32 and 42 indicating that virtual printer 56B and any other associated peripherals 16 are active and available for use.

In an example embodiment, peripheral manager software 40 updates active peripheral list 46 to reflect that printer 52, print spooler 54, virtual printers 56A and 56B, and any other associated peripherals 16 are active and available for use.

In the example embodiment, peripheral manager software 40 adds information identifying computers 14A and 14B of peripheral stations 50A and 50B to peripheral computer list 44.

In the example embodiment, peripheral manager software 40 adds available peripherals 16 to logical groupings in configuration data 49, or updates configuration data 49 to reflect changes from a previous list 46.

In an example embodiment, peripheral manager software 40 may track and monitor printer 52 and print spooler 54 differently from virtual printers 56A and 56B, since printer 52 and print spooler 54 are not directly accessible to application software 20 when configured this way.

For example, peripheral manager software 40 may track and monitor printer 52 and print spooler 54 for operation, e.g., as being on or offline, but only list virtual printers 56A and 56B as available printers in configuration data 49 for use by application software 20. In one example configuration, peripheral manager software 40 may list one grouping for peripheral station 50A to include virtual printer 56A. Peripheral manager software 40 may list another grouping for peripheral station 50B to include virtual printer 56B. If peripheral manager software 40 determines that printer 52 is unavailable, then peripheral manager software 40 lists all virtual printers 56 in all stations that utilize printer 52, including stations 50A and 50B, as offline.

In step 82, peripheral manager software 40 receives a message from application software 20 of computer 12 through web service software 24 and 42 requesting a connection to a particular type of printer, such as a receipt printer.

In step 84, peripheral manager software 40 adds information identifying computer 12 to client computer list 48, and/or updates client computer list 48 to reflect changes in received identifying information.

In step 86, peripheral manager software 40 establishes a mapping in configuration data 49 of computer 12 to a printer of the type requested in a logical grouping in configuration data 49.

In the example embodiment, printer 52 is not a choice for a printer, but virtual printers 56A and 56B are choices in configuration data 49.

In an example embodiment, peripheral manager software 40 maps computer 12 to virtual printer 56A associated with peripheral station 50A.

In another example embodiment, peripheral manager software 40 maps computer 12 to virtual printer 56B associated with peripheral station 50B.

In step 88, peripheral manager software 40 sends a message to application software 20 through web service software 24 and 42 with information identifying computer 14 and the mapped printer. For example, peripheral station manager 40 sends application 20 a URL for the web services used to control the mapped printer, virtual printer 56A or 56B. Peripheral station manager 40 steps aside and allows application 20 to communicate with the mapped printer through web service software 32.

In step 90, computer 14 at the mapped peripheral station 50 receives a web services request from application software 20 to connect to a corresponding virtual printer 56.

In an example embodiment, computer 14A of peripheral station 50A receives the request.

In another example embodiment, computer 14B of peripheral station 50B receives the request.

In step 92, computer 14 at the mapped peripheral station 50 routes the job to print spooler 54 of peripheral station 50A according to settings in the corresponding configuration file 59.

In an example embodiment, computer 14A of peripheral station 50A receives the request and routes the job to print spooler 54 in accordance with settings in configuration file 59A.

In another example embodiment, computer 14B of peripheral station 50B receives the request and routes the job to print spooler 54 in accordance with settings in configuration file 59B.

Regardless, print spooler 54 spools jobs from both virtual printer 56A and virtual printer 56B and printer 52 prints the jobs. Print spooler 54 spools jobs from one or a plurality of different virtual printers 56 configured to use print spooler 54.

In step 92, peripheral manager software 40 receives and monitors messages sent from computer 12 and computer 14 at the mapped peripheral station 50 and releases the connection when application software 20 no longer claims either virtual printer 50A or 50B, or when computer 12, computer 14, or any mapped peripheral 16 go offline. Peripheral manager software 40 removes the corresponding mapping in configuration data 49.

Advantageously, by configuring one or more of the peripheral stations 50 with virtual printers 56, the number of physical printers 52 may be reduced.

Although the present invention has been described with particular reference to certain preferred embodiments thereof, variations and modifications of the present invention can be effected within the spirit and scope of the following claims.

What is claimed is:

1. A method of connecting a first computer to a virtual printer of a second computer comprising:
    determining by a peripheral manager that a virtual printer of a second computer is available for use, including receiving a printer availability message from the second computer;
    broadcasting, by the peripheral manager, over a network to other computers that the virtual printer is available for use;
    receiving a request from the first computer through a web service to connect to the virtual printer by the peripheral manager;
    mapping the virtual printer to the first computer by the peripheral manager; and
    sending, by the peripheral manager, information to the first computer through the web service to facilitate connection by the first computer to the virtual printer through the second computer.

2. The method of claim 1, wherein the second computer is configured to send print jobs from the virtual printer to a print spooler associated with a hardware printing device.

3. The method of claim 2, wherein the second computer is configured with the virtual printer, the print spooler, and the hardware printing device as a peripheral station.

4. The method of claim 2, wherein the second computer is configured with the virtual printer as a peripheral station.

5. The method of claim 4, wherein the print spooler and the hardware printing device are coupled to a third computer and the second computer is configured to send the print jobs from the virtual printer to the third computer.

6. The method of claim 5, wherein the third computer is configured with the print spooler and the hardware printing device as another peripheral station.

7. The method of claim 2, wherein determining comprises determining whether the hardware printing device is available for use.

8. The method of claim 2, further comprising:
    determining that the hardware printing device is unavailable for use; and
    listing the virtual printer as unavailable for use when the hardware printing device is unavailable for use.

* * * * *